United States Patent Office 3,178,439
Patented Apr. 13, 1965

3,178,439
N-ALKANOYL AND ALKENOYL HYDROXY
ALKYL PIPERIDIDES
Francis E. Cislak, Indianapolis, Ind., assignor to Reilly
Tar & Chemical Corporation, Indianapolis, Ind., a corporation of Indiana
No Drawing. Filed May 6, 1963, Ser. No. 278,409
6 Claims. (Cl. 260—294.7)

This invention relates to a new composition of matter. More specifically, it relates to a new class of organic compounds.

The new class of organic compounds which are the subject matter of my present invention are organic acid hydroxyalkylene piperidides. These new hydroxyalkylene piperidides have the following general formula:

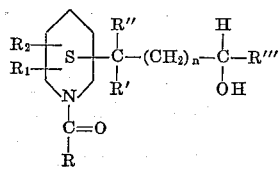

wherein $R_1$, $R_2$, $R'$, $R''$, and $R'''$ represent hydrogen or lower alkyl, R represents an alkyl, alkenyl, carboxy alkyl, hydroxy alkyl, aryl, carboxy aryl, pyridyl piperidyl, or an alicyclic radical and $n$ represents a whole number from 0 to 6.

In general my new class of compounds may be prepared by the interaction of a hydroxyalkylpiperidine with a carboxylic acid or a carboxylic acid ester. The equation below portrays the preparation of the stearic acid piperidide of 4-hydroxypropylpiperidine:

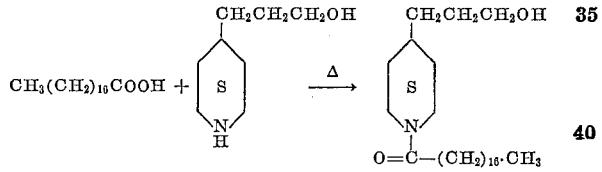

The manner in which the compounds of my invention may be prepared is illustrated by the following examples. It is to be understood that these examples are by way of illustration only and are not intended as a limitation upon my invention.

EXAMPLE 1

*Stearic acid-(4-hydroxypropyl)piperidide*

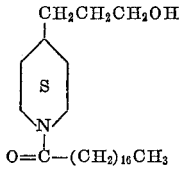

A mixture of 129 grams of 4-hydroxypropylpiperidine and 284 grams of stearic acid is placed into a one liter flask. The flask is connected with a reflux condenser and a Dean-Stark water trap. The mixture is heated to cause a reaction of the stearic acid and the 4-hydroxypropylpiperidine. The water evolved during the reaction is condensed and collected in the water trap. As the rate of water evolution diminishes, the temperature of the reaction mixture is gradually increased. When no more water is evolved, the heating is discontinued, the stearic acid-(4-hydroxypropyl)piperidide formed during the reaction is cooled and poured into a shallow pan.

As formed the stearic acid-(4-hydroxypropyl)piperidide contains a small amount of the stearic acid ester of 4-hydroxypropylpiperidine. For most uses the presence of the ester is not objectionable. If, however, the pure piperidide is desired, the reaction product may be purified by solvent extraction.

The stearic acid-(4-hydroxypropyl)piperidide is particularly useful as a surfactant and as a constituent of detergent formulations. It is soluble in hot water and in alcohols. It boils at above about 150° C. at 5 mm. Hg pressure.

EXAMPLE 2

*Oleic acid-(2-hydroxyethyl)piperidide*

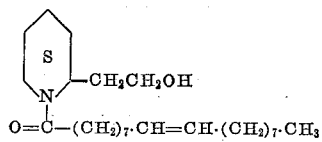

The procedure of Example 1 is repeated with the exception that 115 grams of 2-hydroxyethylpiperidine is used in place of the 129 grams of 4-hydroxypropylpiperidine and 282 grams of oleic acid is used in place of the 284 grams of stearic acid.

EXAMPLE 3

*Lauric acid-(2-hydroxyethyl-5-ethyl)piperidide*

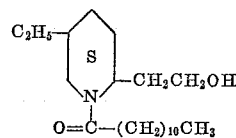

The procedure of Example 1 is repeated with the exception that 143 grams of 2-hydroxyethyl-5-ethylpiperidine is used in place of the 129 grams of 4-hydroxypropylpiperidine and 200 grams of lauric acid is used in place of the 284 grams of stearic acid.

EXAMPLE 4

*Palmitic acid-(3-hydroxypropyl)piperidide*

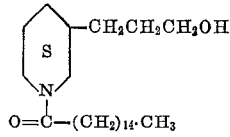

The procedure of Example 1 is repeated with the exception that 3-hydroxypropylpiperidine is used in place of the 4-hydroxypropylpiperidine and 256 grams of palmitic acid is used in place of the 284 grams of stearic acid.

EXAMPLE 5

*Oleic acid-(4-3'-hydroxybutyl)piperidide*

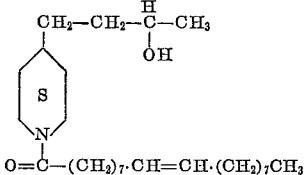

The procedure of Example 2 is repeated with the exception that 141 grams of 4-3'-hydroxybutylpiperidine is used in place of the 115 grams of 2-hydroxyethylpiperidine.

EXAMPLE 6

*Adipic acid-(4-hydroxypropyl)piperidide*

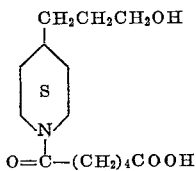

The procedure of Example 1 is repeated with the exception that 146 grams of adipic acid is used in place of the 284 grams of stearic acid.

EXAMPLE 7

*Lauric acid-(4-3'-5'-hydroxypentyl)piperidide*

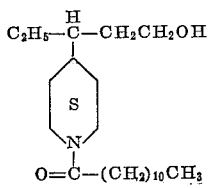

The procedure of Example 3 is repeated with the exception that 157 grams of 4-3'-5'-hydroxypentylpiperidine is used in place of the 129 grams of 4-hydroxypropylpiperidine.

My hydroxyalkylenepiperidides are useful in the preparation of wetting agents, detergents, and cleaning compounds. They are also useful as plasticizers and as mold release agents. The hydroxyl group of my hydroxyalkylenepiperidides may be esterified to yield the corresponding esters; these esters are useful as plasticizers and as lubricants.

I claim as my invention:
1. A fatty acid hydroxyalkylpiperidide having the formula

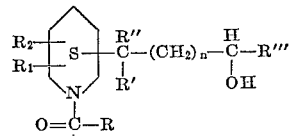

wherein $R_1$, $R_2$, $R'$, $R''$, $R'''$ are independently selected from the class consisting of hydrogen and lower alkyl, R represents a member of the class consisting of higher alkyl and higher alkenyl groups, and $n$ represents a small whole number selected from 0 to 6.

2. Stearic acid-(4-hydroxypropyl)piperidide.
3. Adipic acid-(4-hydroxypropyl)piperidide.
4. A hydroxyalkylpiperidide of claim 1 in which R is the alkyl radical $CH_3 \cdot (CH_2)_{16}$—.
5. A hydroxyalkylpiperidide of claim 1 in which R is the alkenyl radical $CH_3 \cdot (CH_2)_7 \cdot CH=CH \cdot (CH_2)_7$—.
6. A hydroxyalkylpiperidide of claim 1 in which R is the alkyl radical $CH_3 \cdot (CH_2)_{10}$—.

References Cited by the Examiner

UNITED STATES PATENTS

| | | | |
|---|---|---|---|
| 2,166,118 | 7/39 | Bousquet et al. | 260—294.7 |
| 2,166,120 | 7/39 | Bousquet | 260—294.7 |
| 2,529,982 | 11/50 | Walter | 260—294 |
| 3,079,388 | 2/63 | Dupuy et al. | 260—247.7 |

NICHOLAS S. RIZZO, *Primary Examiner.*

JOHN D. RANDOLPH, *Examiner.*